(12) United States Patent
Mizuno (10) Patent No.: US 7,419,310 B2
(45) Date of Patent: Sep. 2, 2008

(54) OPTICAL TRANSMISSION CONNECTOR AND ELECTRONIC APPARATUS

(75) Inventor: Hiroshi Mizuno, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/510,699

(22) Filed: Aug. 28, 2006

(65) Prior Publication Data

US 2007/0047881 A1 Mar. 1, 2007

(30) Foreign Application Priority Data

Aug. 31, 2005 (JP) ............................ 2005-252123

(51) Int. Cl.
*G02B 6/46* (2006.01)
(52) U.S. Cl. .............................. 385/88; 385/92; 385/94
(58) Field of Classification Search .................... 385/88
See application file for complete search history.

(56) References Cited

U.S. PATENT DOCUMENTS

2004/0033030 A1* 2/2004 Ohbayashi et al. ............ 385/88

FOREIGN PATENT DOCUMENTS

| JP | 62-74770 U | 5/1987 |
|----|------------|--------|
| JP | 4-357682 A | 12/1992 |
| JP | 7-41993 | * 7/1995 |
| JP | 7-41993 U | 7/1995 |
| JP | 2000-131564 A | 5/2000 |
| JP | 2004-79202 A | 3/2004 |

* cited by examiner

*Primary Examiner*—Frank G Font
*Assistant Examiner*—Mary A El Shammaa
(74) *Attorney, Agent, or Firm*—Birch, Stewart, Kolasch & Birch, LLP (57) ABSTRACT

An optical transmission connector comprises a holder unit, a shutter mechanism unit for opening and closing an optical plug housing unit for housing an optical plug, an element housing unit for housing a photoelectric effect element, and a fixing metal plate for fixing the holder unit to a mounting board. The fixing metal plate has a fixing terminal unit which is butted and engaged with a side portion of the holder unit, and is protruded from a bottom portion of the holder unit at an appropriate position, so that the fixing terminal unit can be fitted into the mounting board. A bent portion is formed in the fixing terminal unit in a length direction thereof. The fixing metal plate has a positioning concave portion, corresponding to a positioning convex portion, and is in a shape which is fitted into a fitting slit.

27 Claims, 10 Drawing Sheets

OPTICAL TRANSMISSION CONNECTOR AND ELECTRONIC APPARATUS

BACKGROUND OF THE INVENTION

This application claims priority under 35 U.S.C. §119(a) on Patent Application No. 2005-252123 filed in Japan on Aug. 31, 2005, the entire contents of which are hereby incorporated by reference.

The present invention relates to an optical transmission connector for use in an electronic apparatus, such as a DVD player, a DVD recorder, a liquid crystal TV, a Set Top Box (STB: an adaptor apparatus for satellite broadcast), an AV receiver, or the like, and an electronic apparatus employing the optical transmission connector.

An optical transmission connector which transmits an electrical signal as an optical signal has been proposed. The optical transmission connector is constructed as an optical fiber link which employs an optical fiber, and is becoming adopted, as a transmission system which can reliably eliminate noise caused by an electrical signal, in a DVD player, a DVD recorder, a liquid crystal TV, an STB, an AV receiver, and the like which require a high level of noise withstanding capability.

The optical transmission connector is conventionally fixed to mounting boards of these electronic apparatuses with screws. However, from the viewpoint of workability and outer appearance, there has been a demand for an optical transmission connector of a self-standing type which is directly attached to a mounting board.

An optical transmission connector which functions as a transmitter unit or a receiver unit, comprises an element housing unit (a light emitting element unit or a light receiving element unit) for housing a photoelectric effect element (a light emitting element or a light receiving element), a holder unit comprising an optical plug housing unit for housing an optical plug which is composed of a fiber-optic cable and is used for transmission of an optical signal, a shutter mechanism for opening and closing the optical plug housing unit, a spring (coil spring) for biasing a shutter plate of the shutter mechanism in a direction in which the shutter plate is closed, and a fixing metal plate for mounting and fixing the holder unit to a mounting board.

This optical transmission connector is provided with the shutter mechanism which prevents dust and foreign matter from entering the element housing unit and the plug housing unit, and protects eyes from leakage light. The shutter mechanism is configured to open or close a lid (shutter plate), depending on insertion or extraction of an optical plug.

Figure 8:
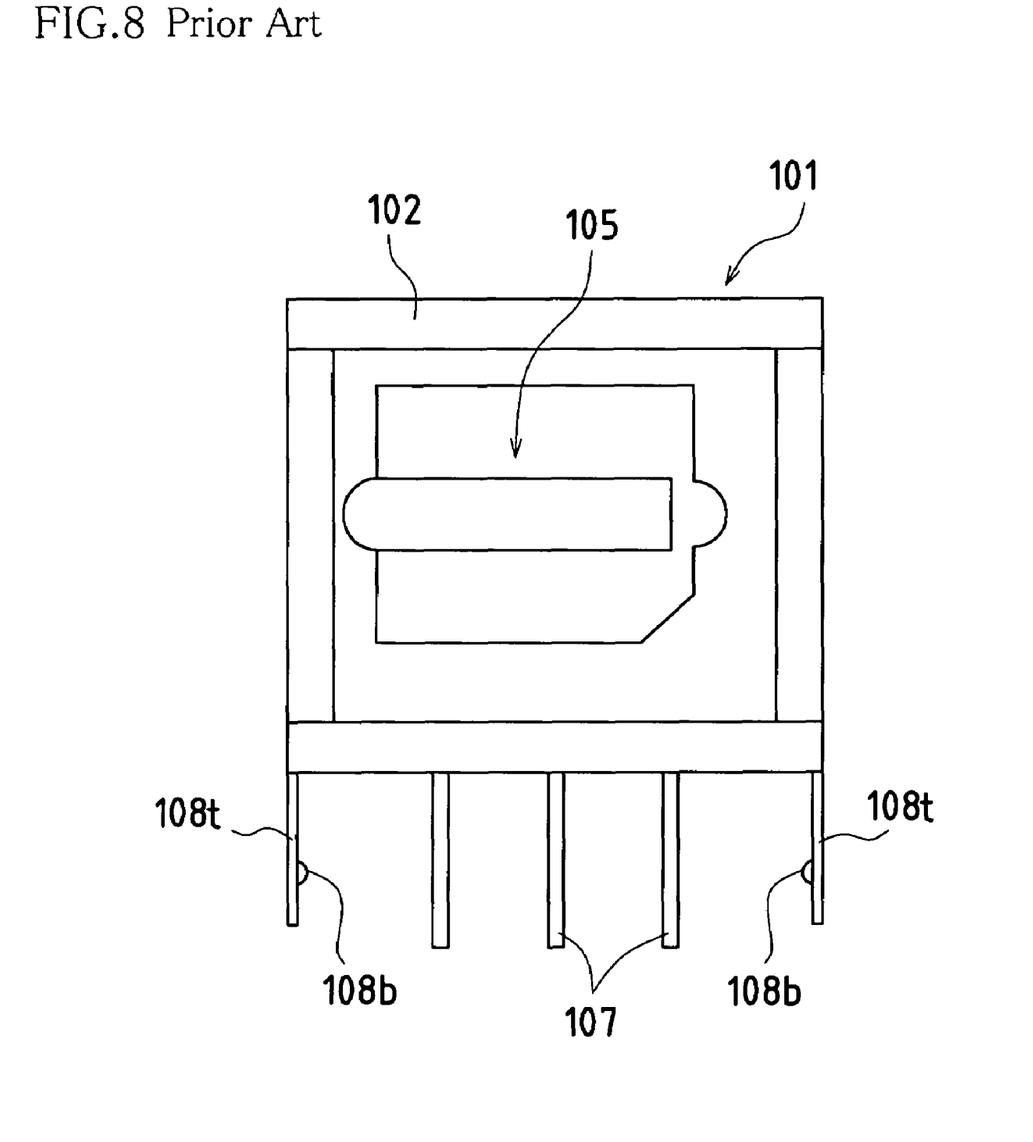
FIG. 8 is a front view of a conventional optical transmission connector as viewed from a side from which an optical plug is inserted.

FIG. 8 is a front view of a conventional optical transmission connector as viewed from a side from which an optical plug is inserted.

A conventional optical transmission connector 101 comprises a shutter mechanism unit 105 which serves as an insertion opening through which an optical plug (not shown) is inserted into a front portion of a holder unit 102. A lead terminal 107 of a photoelectric effect element (not shown) housed in the holder unit 102, and a fixing terminal unit 108$t$ of a fixing metal plate 108 (see FIGS. 9A and 9B) for mounting and fixing the holder unit 102 to a mounting board 140 (see FIGS. 9A and 9B), are each protruded from a bottom surface of the holder unit 102. A hemispherical protrusion 108$b$ for fastening the holder unit 102 to the mounting board 140 is formed on the fixing terminal unit 108$t$.

Figure 9A:
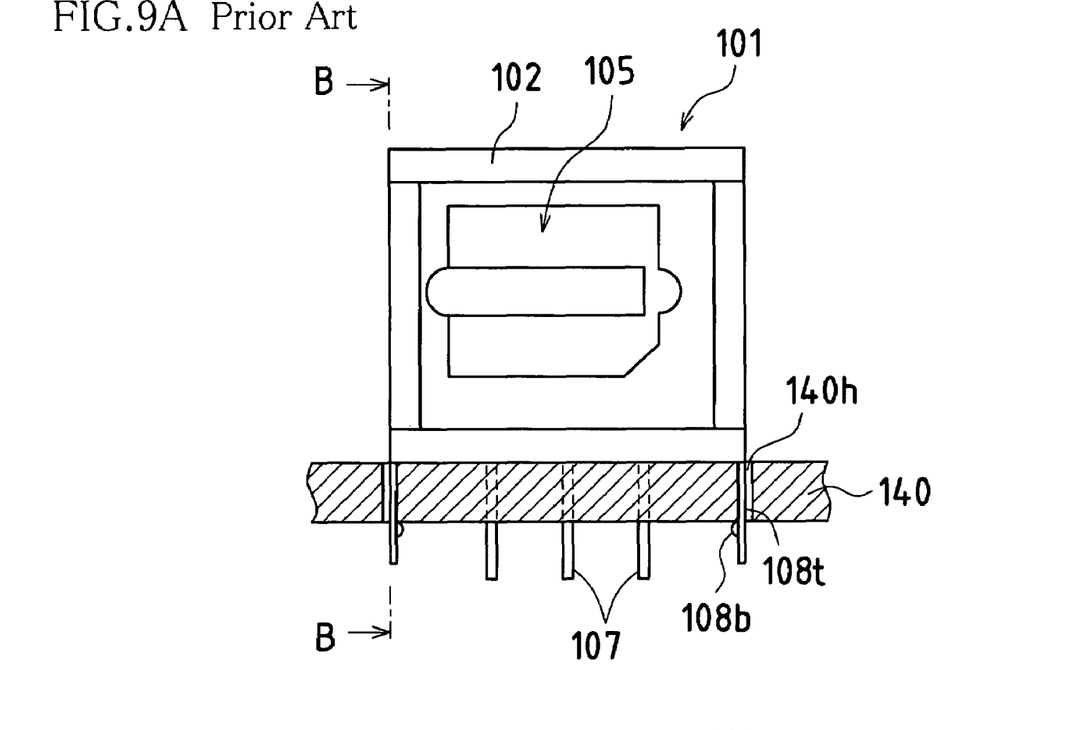
FIG. 9A is a diagram for explaining an action of the fixing metal plate of the conventional optical transmission connector, indicating a partially cross-sectional, front view as viewed from a side from which an optical plug is inserted.
Figure 9B:
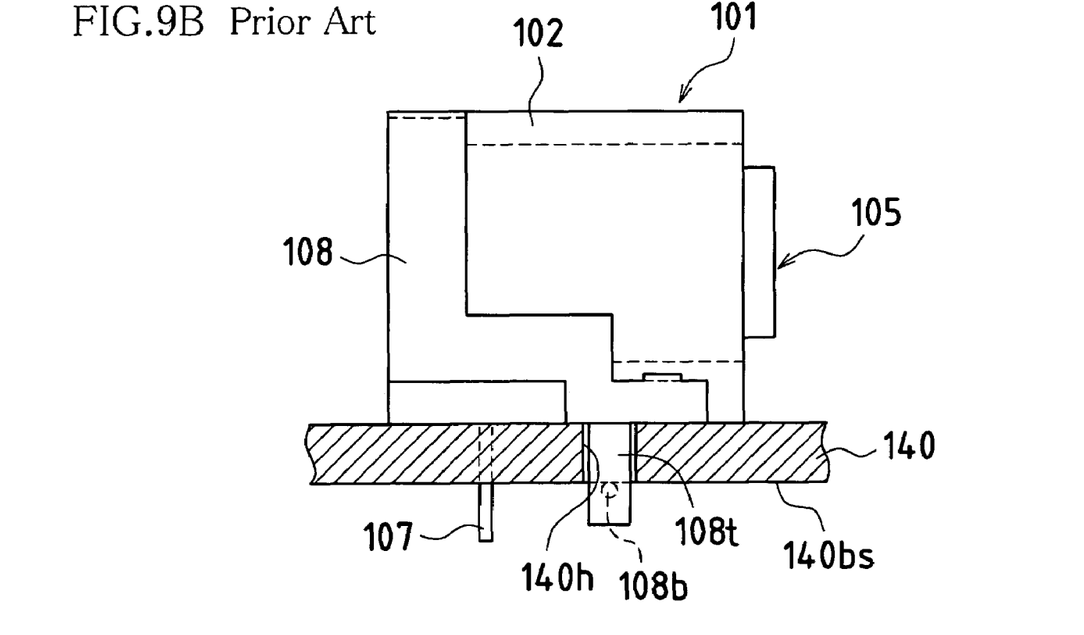
FIG. 9B is a left side view thereof.

FIGS. 9A and 9B are diagrams for explaining an action of the fixing metal plate of the conventional optical transmission connector. FIG. 9A is a partially cross-sectional, front view as viewed from a side from which an optical plug is inserted. FIG. 9B is a left side view thereof. Note that FIG. 9A indicates a cross-section of the mounting board 140, taken at a position corresponding to a fitting hole 140$h$, and FIG. 9B indicates a cross-section of the mounting board 140, taken along line B-B of FIG. 9A.

When the optical transmission connector 101 is mounted on the mounting board 140, the fixing terminal unit 108$t$ formed at a tip of the fixing metal plate 108 for fixing the holder unit 102 to the mounting board 140 is inserted into the fitting hole 140$h$ formed in the mounting board 140, so that the holder unit 102 is fixed to and held on the mounting board 140.

The protrusion 108$b$ formed on the fixing terminal unit 108$t$ is formed at a position which matches a board thickness of the mounting board 140, so that the protrusion 108$b$ butts and engages with the mounting board 140 on a bottom surface 140$bs$ (an opening end portion of the fitting hole 140$h$) of the mounting board 140. However, the protrusion 108$b$ has a hemispherical shape, and therefore, the butt and engagement are only achieved at a point on the great circle (having the maximum diameter) of the hemisphere. Therefore, when external force is applied to the holder unit 102, the fixing terminal unit 108$t$ can be moved and swayed along a hemispherical line, depending on the external force. In other words, the protrusion 108$b$ (the fixing terminal unit 108$t$) for fixing and stabilizing the holder unit 102 does not achieve the desired purpose, so that the optical transmission connector cannot be stably connected to an optical plug (not shown).

Figure 10:
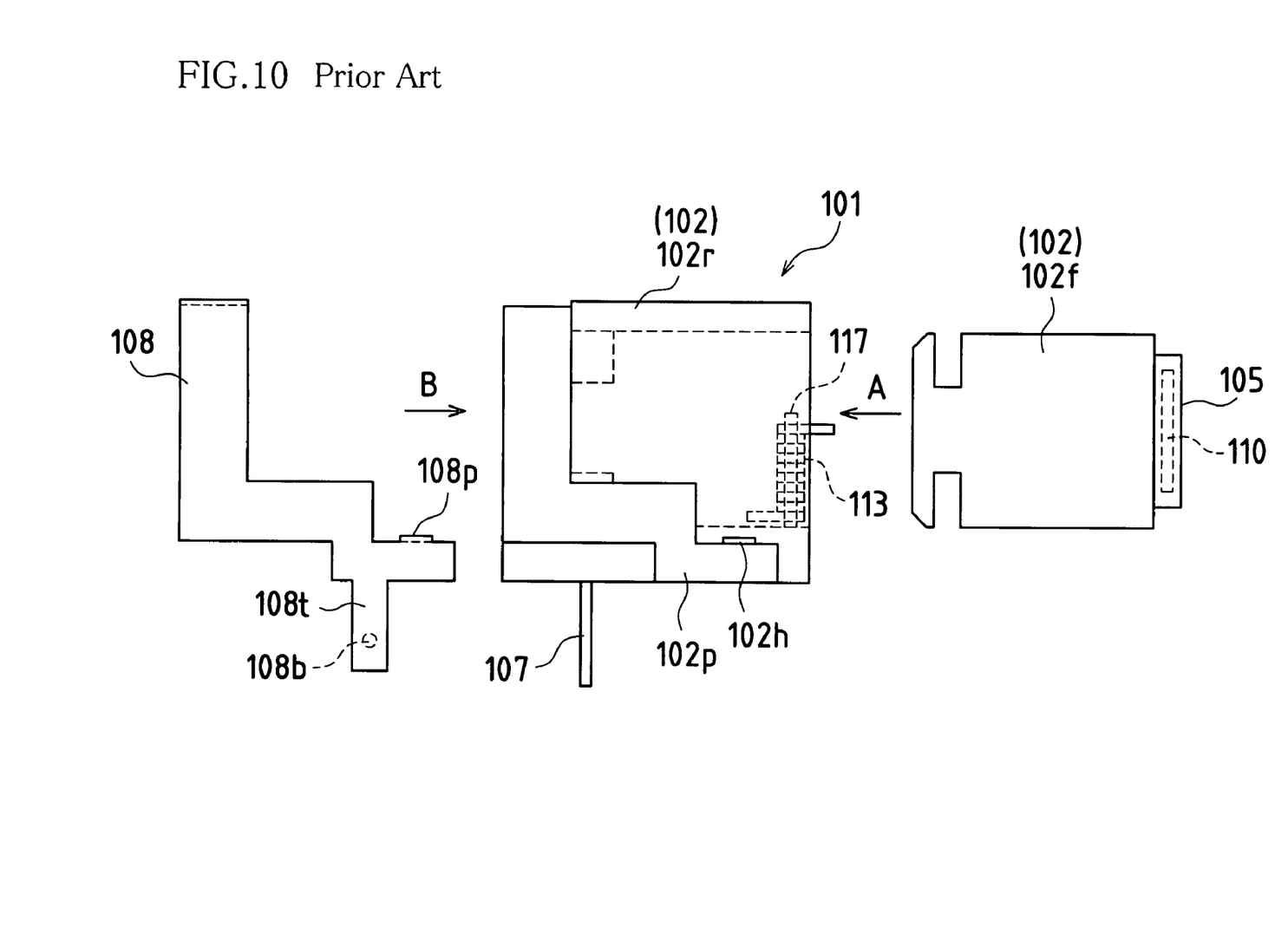
FIG. 10 is an exploded side view for explaining how the conventional optical transmission connector is assembled.

FIG. 10 is an exploded side view for explaining how the conventional optical transmission connector is assembled.

The holder unit 102 included in the conventional optical transmission connector 101 has two separate units, i.e., a front housing unit 102$f$ and a rear housing unit 102$r$.

The front housing unit 102$f$ and the rear housing unit 102$r$ are joined together to assemble the optical transmission connector 101 in accordance with the following procedure.

Initially, the shutter mechanism unit 105 including a shutter plate 110 is attached to the front housing unit 102$f$ from the inside thereof. A coil spring 113 is engaged and incorporated with a coil spring holding post 117 provided in the rear housing unit 102$r$.

Next, the front housing unit 102$f$ is fitted into the rear housing unit 102$r$ in a direction indicated with arrow A to be mutually joined with the rear housing unit 102$r$. Thereafter, the fixing metal plate 108 is fastened to a metal plate fastening concave portion 102$p$ formed on a surface of the rear housing unit 102$r$ in a direction indicated with arrow B to be mutually joined with the metal plate fastening concave portion 102$p$. Further, a holder cover (not shown) is attached to surfaces of the rear housing unit 102$r$ and the fixing metal plate 108, thereby obtaining a complete structure of the optical transmission connector 101.

Note that a fastening hole 102$h$ for fastening a nail portion 108$p$ provided on the fixing metal plate 108 is formed in the rear housing unit 102$r$. By fitting the nail portion 108$p$ into the fastening hole 102$h$, the fixing metal plate 108 is fixed to the rear housing unit 102$r$ so as to secure mechanical strength.

The conventional optical transmission connector 101 thus constructed has a complicated assembly structure and a large number of parts, resulting in high manufacturing cost.

The coil spring 113 is fixed to the rear housing unit 102$r$ only by pressure applied by the front housing unit 102$f$ after the coil spring 113 is incorporated into the rear housing unit 102$r$. Therefore, for example, the coil spring 113 is likely to be detached from the rear housing unit 102$r$, i.e., there is a problem with reliability. In addition, the assembly process is complicated, resulting in an increase in cost.

When the optical transmission connector 101 is mounted on the mounting board 140, a flux for soldering is used. The flux seeps up through a gap between the front housing unit 102f and the rear housing unit 102r, leading to an interference with opening/closing of the shutter plate 110.

When the nail portion 108p of the fixing metal plate 108 is fitted into the fastening hole 102h of the rear housing unit 102r, the fitting work is not easy, resulting in low workability.

Note that there is also a known conventional optical transmission connector which is disclosed in JP 2000-131564A.

SUMMARY OF THE INVENTION

The present invention is provided in view of this situation. An object of the present invention is to provide an optical transmission connector in which an engagement portion (butting portion) of a holder unit of an optical transmission connector and a mounting board is increased by shaping the engagement portion into a line extending a width direction of a fixing terminal unit, so that the optical transmission connector has large fixation strength (engagement strength) and can be assembled with high accuracy.

Another object of the present invention is to provide an optical transmission connector in which the configuration is simple and the number of parts is small, and therefore, which can be manufactured with low cost.

Still another object of the present invention is to provide an optical transmission connector which is not affected by a flux and has high reliability.

Even still another object of the present invention is to provide an electronic apparatus which is easy to assemble, has high reliability, and can be manufactured with low cost.

An optical transmission connector according to the present invention comprises a holder unit including an element housing unit for housing a photoelectric effect element and an optical plug housing unit for housing an optical plug, a shutter mechanism unit for opening and closing the optical plug housing unit, and a fixing metal plate for fixing the holder unit to the mounting board. The fixing metal plate has a fixing terminal unit protruding from a bottom portion of the holder unit, and the fixing terminal unit has a bent portion in a length direction thereof.

With this structure, the bent portion of the fixing terminal unit can be engaged with the mounting board along a line, resulting in large engagement strength. Thereby, it is possible to reliably fix the holder unit to the mounting board.

In the optical transmission connector of the present invention, the bent portion is in the shape of a wedge.

With this structure, a butting portion of the fixing terminal unit and the mounting board can be increased, thereby making it possible to reliably fix the holder unit to the mounting board.

In the optical transmission connector of the present invention, the fixing metal plate has a positioning concave portion which is engaged with a positioning convex portion provided in the holder unit.

With this structure, it is possible to reliably position the fixing metal plate with respect to the holder unit, thereby making it possible to accurately fix the holder unit to the mounting board.

In the optical transmission connector of the present invention, the fixing metal plate is configured to fit into a fitting slit provided in the holder unit.

With this structure, the fixing metal plate can be sandwiched by the fitting slit, thereby making it possible to firmly join the fixing metal plate with the holder unit, and therefore, firmly fix the holder unit to the mounting board.

In the optical transmission connector of the present invention, the fixing metal plate is symmetrically provided on left and right side portions of the holder unit.

With this structure, the fixing metal plate can sandwich the holder unit on both sides thereof, thereby making it possible to more firmly fix the holder unit to the mounting board.

In the optical transmission connector of the present invention, the fixing metal plate symmetrically provided on the left and right side portions of the holder unit, continuously extends across an upper portion of the holder unit.

With this structure, the fixing metal plate is integrally formed, thereby making it possible to reliably fix the holder unit and easily assemble the fixing metal plate with the holder unit.

In the optical transmission connector of the present invention, the shutter mechanism unit has a shutter plate, and the shutter plate has a spring end holding concave portion for holding an end of a spring for biasing the shutter plate in a direction in which the shutter plate is closed.

With this structure, the shutter plate can be easily opened and closed using a simple structure, depending on insertion and extraction of an optical plug, thereby providing an optical transmission connector having a shutter mechanism unit having high performance.

In the optical transmission connector of the present invention, the shutter plate has a spring attachment shaft which is engaged with the spring.

With this structure, a spring can be attached to the shutter plate, thereby making it possible to provide a shutter plate which has a simple structure, is easy to assemble, and can provide a stable opening/closing operation. Thus, an optical transmission connector having a highly reliable shutter mechanism unit is provided.

In the optical transmission connector of the present invention, the shutter plate has a spring accidental detachment preventing unit for preventing the spring from being accidentally detached, corresponding to the spring attachment shaft.

With this structure, the stability of the shutter plate is improved, so that the assembly workability of the shutter mechanism unit is improved, resulting in an optical transmission connector in which the spring is not detached, and therefore, has high reliability.

In the optical transmission connector of the present invention, the spring is housed into the holder when an optical plug is inserted into the optical plug housing unit.

With this structure, the spring can be housed along with the shutter plate, resulting in an optical transmission connector having a small size and a space-saving structure.

In the optical transmission connector of the present invention, the other end of the spring is slid in the holder when an optical plug is inserted into the optical plug housing unit.

With this structure, it is possible to smoothly open and close the shutter plate, resulting in an optical transmission connector in which an optical plug can be smoothly extracted and inserted.

In the optical transmission connector of the present invention, the other end of the spring is slid along a spring guiding groove portion provided in the holder.

With this structure, it is possible to reliably slide the other end of the spring, resulting in an optical transmission connector in which the shutter mechanism unit is smoothly operated and which has high reliability.

In the optical transmission connector of the present invention, a bottom surface of the holder has a bottom surface concave portion for preventing seepage of a flux, corresponding to the shutter mechanism unit.

With this structure, when the optical transmission connector is mounted onto the mounting board, a surface distance from the mounting board to the shutter mechanism unit can be increased, thereby making it possible to prevent the flux from seeping up to the shutter mechanism unit. Therefore, there is not an influence of mounting onto the mounting board on the shutter mechanism unit, resulting in an optical transmission connector which has a reliable shutter operation.

In the optical transmission connector of the present invention, the photoelectric effect element is a light receiving element or a light emitting element.

With this structure, the optical transmission connector can be applied to any form of light transmission: emission; reception; and emission/reception.

The present invention also provides an optical transmission connector with an optical plug connected thereto, in which the optical transmission connector is the optical transmission connector of the present invention.

With this structure, an optical transmission connector is provided in which the number of parts is small, is easy to assemble with high accuracy and reliability, and can be manufactured with low cost.

The present invention also provides an electronic apparatus comprising an optical transmission connector in which the optical transmission connector is the optical transmission connector of the present invention.

With this structure, an electronic apparatus is provided in which the number of parts is small, is easy to assemble with high accuracy and reliability, and can be manufactured with low cost.

BRIEF DESCRIPTION OF THE DRAWINGS

FIGS. 3A and 3B are diagrams for explaining an action of a fixing metal plate of the optical transmission connector of Embodiment 1 of the present invention.

FIGS. 6A and 6B are diagram for explaining a relationship between the optical transmission connector of Embodiment 1 of the present invention and an optical plug.

DESCRIPTION OF THE PREFERRED EMBODIMENTS

Hereinafter, embodiments of the present invention will be described with reference to the accompanying drawings.

Embodiment 1

Figure 1A:
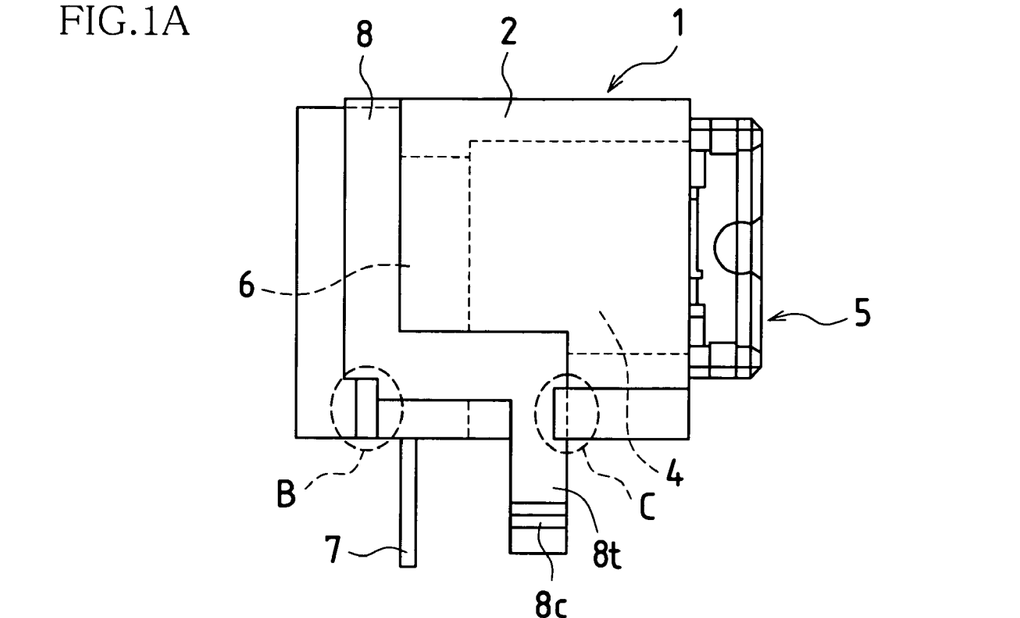
FIG. 1A is a side view of an optical transmission connector according to Embodiment 1 of the present invention with a shutter mechanism unit thereof being provided on a right-hand side.
Figure 1B:
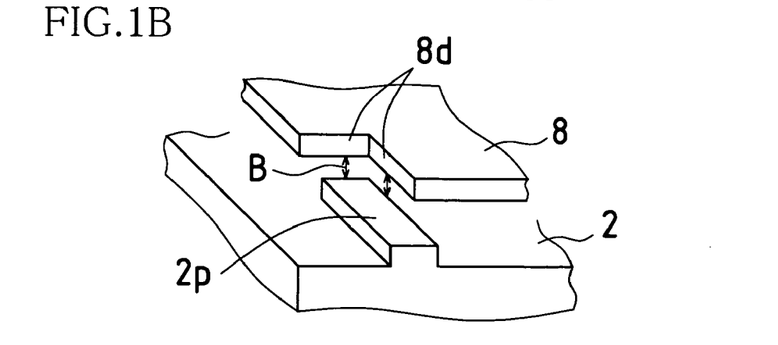
FIG. 1B is an enlarged and exploded perspective view of a portion indicated with a dashed-line ellipse B of FIG. 1A.
Figure 1C:
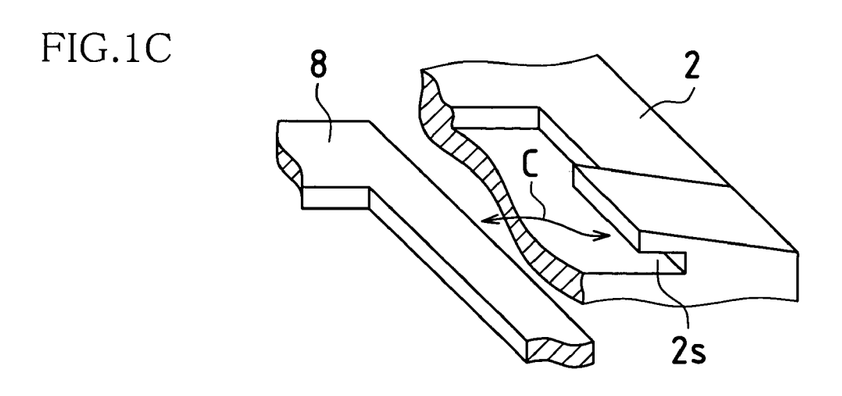
FIG. 1C is an enlarged and exploded perspective view of a portion indicated with a dashed-line ellipse C of FIG. 1A.

FIG. 1A is a side view of an optical transmission connector according to Embodiment 1 of the present invention with a shutter mechanism unit thereof being provided on a right-hand side. FIG. 1B is an enlarged and exploded perspective view of a portion indicated with a dashed-line ellipse B of FIG. 1A. FIG. 1C is an enlarged and exploded perspective view of a portion indicated with a dashed-line ellipse C of FIG. 1A.

Figure 3A:
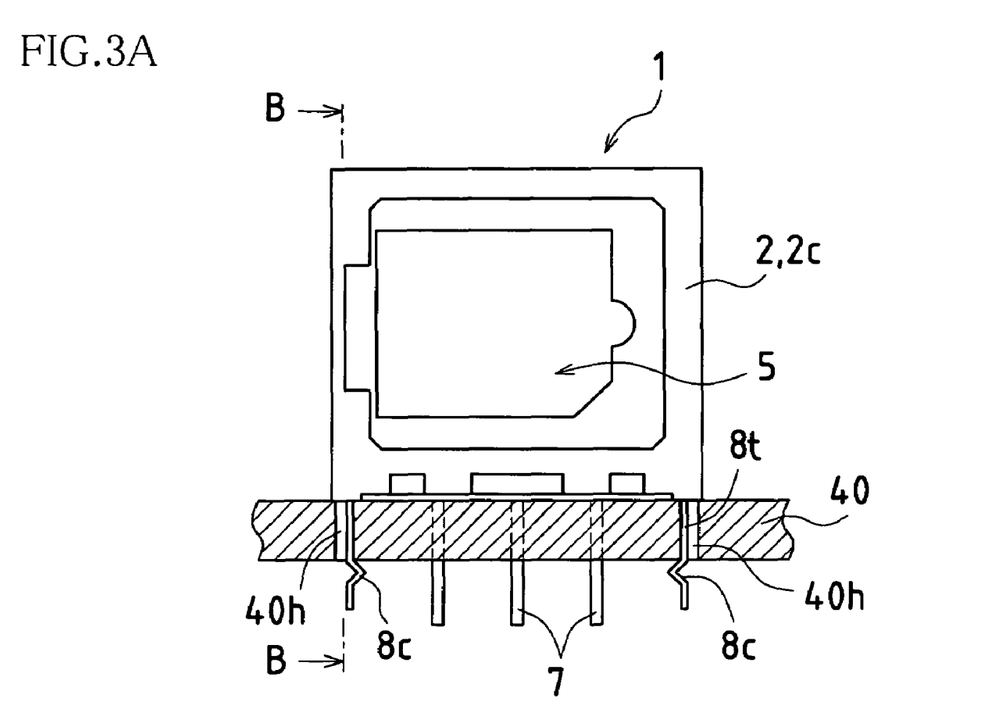
FIG. 3A is a partially cross-sectional, front view as viewed from a side from which an optical plug is inserted.
Figure 3B:
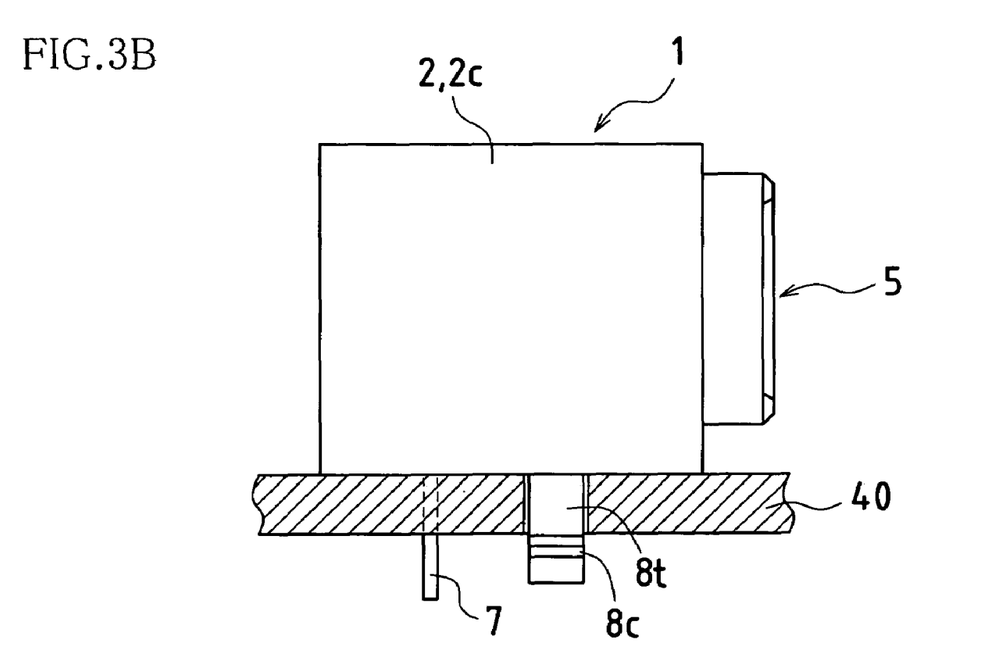
FIG. 3B is a cross-sectional view, taken along line B-B of FIG. 3A.

The optical transmission connector 1 of this embodiment comprises a holder unit 2 serving as a housing, a shutter mechanism unit 5 for opening and closing an optical plug housing unit 4 (see FIGS. 5A and 5B) for housing an optical plug 3 (see FIGS. 6A and 6B), an element housing unit 6 for housing a photoelectric effect element (not shown), and a fixing metal plate 8 for mounting and fixing the holder unit 2 to a mounting board 40 (see FIGS. 3A and 3B). Note that a lead terminal 7 of the photoelectric effect element is protruded from a bottom portion of the holder unit 2, and the lead terminal 7 is connected to a conductor pattern formed on the mounting board 40 as appropriate.

Note that, by using the photoelectric effect element as a light receiving element or a light emitting element, the optical transmission connector 1 can be applied to any one of the following light transmission forms: transmission using the light emitting element; reception using the light receiving element; transmission and reception using the light emitting element and the light receiving element.

The fixing metal plate 8 has a fixing terminal unit 8t which is butted and engaged with a side portion of the holder unit 2, and is protruded from the bottom portion of the holder unit 2 at an appropriate position, thereby making it possible to be fitted into the mounting board 40. The fixing metal plate 8 is integrally formed, continuously extending over an upper portion and left and right side portions (the left side portion is illustrated on the front side of the drawing and the right side portion is positioned on the back side of the drawing (not shown)) of the holder unit 2. Since the fixing metal plate 8 is butted with these surfaces (the upper portion and left and right side portions) of the holder unit 2, the fixing metal plate 8 is more firmly engaged with the holder unit 2, so that the holder unit 2 can be more firmly and reliably fixed to the mounting board 40. Since the fixing metal plate 8 is integrally formed, the fixing metal plate 8 can be easily engaged with the holder unit 2.

A notch-shaped positioning concave portion 8d is formed at an appropriate portion of the fixing metal plate 8, while a positioning convex portion 2p is formed on the holder unit 2, corresponding to the positioning concave portion 8d. Therefore, by engaging the positioning concave portion 8d with the positioning convex portion 2p as indicated with arrow B (FIG. 1B), the fixing metal plate 8 can be reliably positioned with respect to the holder unit 2. Since the fixing metal plate 8 can be reliably positioned with respect to the holder unit 2, the holder unit 2 can be assembled with and fixed to the mounting board 40 with high accuracy.

A fitting slit 2s is formed at an appropriate portion of the holder unit 2. The fixing metal plate 8 has a shape which allows the fixing metal plate 8 to be disposed and fitted into the fitting slit 2s. Therefore, when the fixing metal plate 8 is fitted into the fitting slit 2s as indicated with arrow C (FIG. 1C), the fitting slit 2s sandwiches the fixing metal plate 8. The joining strength of the fixing metal plate 8 and the holder unit 2 can be improved, so that the holder unit 2 can be firmly fixed to the mounting board 40.

The fixing metal plate 8 is provided on the left and right side portions of the holder unit 2 in a manner which the fixing metal plates 8 are bilaterally symmetrical, so that the fixing metal plates 8 can uniformly sandwich the holder unit 2 from both sides thereof. Therefore, the holder unit 2 can be reliably fixed to the mounting board 40.

A bent portion 8c is formed in the fixing terminal unit 8t in a length direction thereof. The bent portion 8c is bent into a wedge shape which is orthogonal to the length direction (see FIGS. 2A and 2B), so that the bent portion 8c butts the mounting board 40 over a broad width thereof. Therefore, an area which butts the mounting board 40 can be broadened, thereby making it possible to obtain a stable, firm, and reliable fixed state (held state). In other words, the self-standing optical transmission connector 1 (the holder unit 2) which is not fastened with screws can be prevented from swaying with respect to the mounting board 40.

Note that the shutter mechanism unit 5 will be described in detail with respect to FIGS. 2A and 2B and thereafter.

Figure 2A:
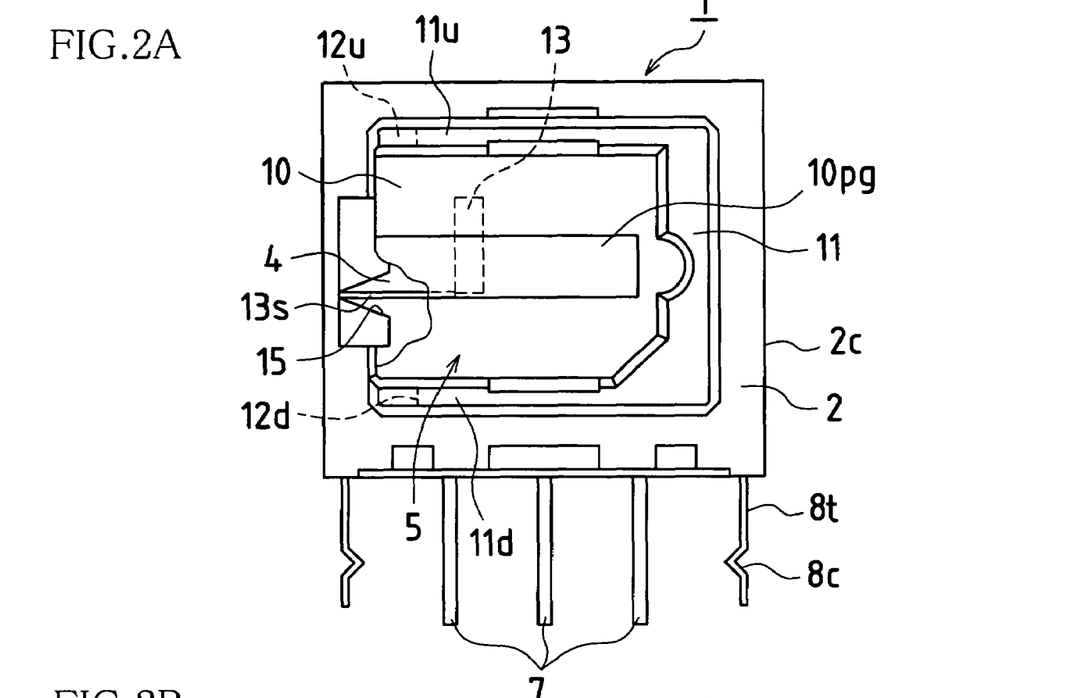
FIG. 2A is a partially cut away, front view of the optical transmission connector of Embodiment 1 of the present invention, as viewed from a side from which an optical plug is inserted.
Figure 2B:
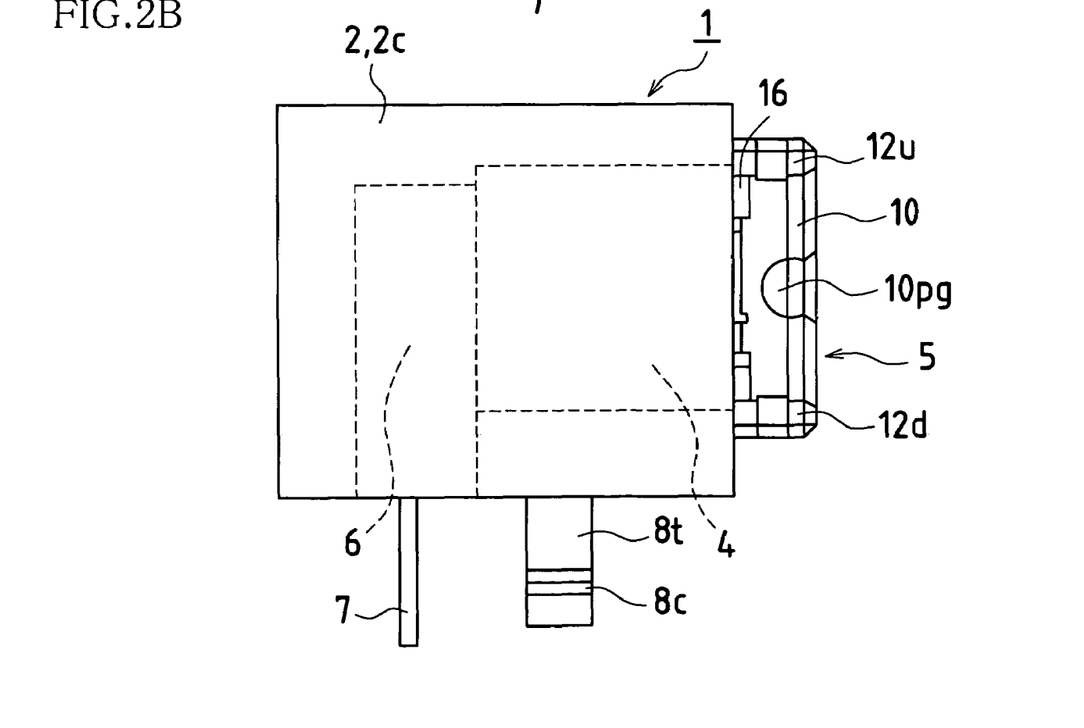
FIG. 2B is a left side view thereof.

FIG. 2A is a diagram for explaining the optical transmission connector of Embodiment 1 of the present invention, providing a partially cut away, front view as viewed from a side from which an optical plug is inserted. FIG. 2B is a left side view thereof.

In the optical transmission connector 1, after the fixing metal plate 8 is engaged with the holder unit 2, a holder cover 2c for covering the holder unit 2 (and the fixing metal plate 8) is provided at an outer periphery (an upper surface and side surfaces) thereof so as to more reliably engage and protect the holder unit 2 and the fixing metal plate 8. Note that the holder cover 2c does not have to be used.

Here, the configuration (particularly, the shutter mechanism unit 5) of the optical transmission connector 1 illustrated in FIGS. 1A to 1C will be described in more detail.

The optical transmission connector 1 comprises the holder unit 2, the shutter mechanism unit 5, and the fixing metal plate 8 for fixing the holder unit 2 to the mounting board 40. The fixing metal plate 8 has the fixing terminal unit 8t which is protruded from the bottom portion of the holder unit 2 toward the mounting board 40. The fixing terminal unit 8t has the bent portion 8c which is bent into a wedge along a direction intersecting the length direction.

Inside the holder unit 2, the optical plug housing unit 4 for housing the optical plug 3 is provided on a side closer to the shutter mechanism unit 5, while the element housing unit 6 for housing a photoelectric effect element is provided on a side opposite to the shutter mechanism unit 5. Note that examples of the photoelectric effect element include a light receiving element (e.g., a phototransistor) and a light emitting element (e.g., a light emitting diode, a laser diode).

The element housing unit 6 may be a light receiving element unit for housing a light receiving element, a light emitting element unit for housing a light emitting element, or a light receiving/emitting element unit for housing both a light receiving element and a light emitting element. When the element housing unit 6 is composed of a light receiving element, reception for light transmission can be performed. When the element housing unit 6 is composed of a light emitting element, emission for light transmission can be performed. When the element housing unit 6 is composed of a light receiving element and a light emitting element, emission and reception for light transmission can be performed.

The shutter mechanism unit 5 comprises a shutter plate 10 for opening and closing the optical plug housing unit 4, depending on extraction and insertion of the optical plug 3.

The shutter plate 10 comprises rotating shafts 10au and 10ad (see FIGS. 4A to 4C) for rotating the shutter plate 10 inward so that the shutter plate 10 is housed into the holder unit 2. The rotating shafts 10au and 10ad are held and supported by bearing portions 12u and 12d formed at an upper end 11u and a lower end 11d of an attachment portion 11 in a manner which allows the rotating shafts 10au and 10ad to rotate.

The shutter plate 10 comprises a plug guiding groove 10pg for guiding the optical plug 3, as a guide groove, on a front surface thereof (a surface corresponding to a direction in which the optical plug 3 is inserted). Also, a spring 13 for biasing the shutter plate 10 in a direction in which the shutter plate 10 is closed is attached to a rear surface of the shutter plate 10. Note that a spring guiding groove portion 15 for sliding an end arm portion (sliding spring arm portion 13s) of the spring 13 is formed inside the holder unit 2 (see a cut-away portion).

The attachment unit 11 is provided with an accidental detachment preventing convex portion 16 (see FIGS. 5A and 5B) for preventing the shutter plate 10 which has been rotated inward and housed into the holder unit 2, from being accidentally removed.

FIGS. 3A and 3B are diagrams for explaining an action of the fixing metal plate of the optical transmission connector of Embodiment 1 of the present invention. FIG. 3A is a partially cross-sectional, front view as viewed from a side from which an optical plug is inserted. FIG. 3B is a cross-sectional view, taken along line B-B of FIG. 3A. Note that FIG. 3A indicates a cross-section at a position corresponding to a fitting hole 40h of the mounting board 40.

When the optical transmission connector 1 is mounted on the mounting board 40, the fixing terminal unit 8t formed at the tip of the fixing metal plate 8 for fixing the holder unit 2 to the mounting board 40, is inserted into the fitting hole 40h formed in the mounting board 40, so that the holder unit 2 is fixed to and held by the mounting board 40.

The bent portion 8c formed in the fixing terminal unit 8t is bent into a wedge (kink) along a direction intersecting the length direction. The bending position is caused to match a board thickness of the mounting board 40, so that the bent portion 8c butts and engages with the fitting hole 40h at the bending position.

The fixing terminal unit 8t has a broad width (in the direction intersecting the length direction). Therefore, the bent portion 8c butts the fitting hole 40h on a line in a width direction thereof, so that a butting area (engagement portion) can be increased, thereby making it possible to increase fixation strength (engagement strength).

Therefore, the fixing terminal unit 8t can stably and reliably fix the holder unit 2 to the mounting board 40, thereby making it possible to stably and reliably hold the self-standing optical transmission connector 1. In other words, according to the optical transmission connector 1 (the fixing metal plate 8) of this embodiment, firmer fixation and holding can be achieved than those of the optical transmission connector 1 of the conventional example, so that the optical transmission connector 1 of this embodiment is stable against external force, i.e., cannot be swayed even when external force is applied.

Figure 4A:
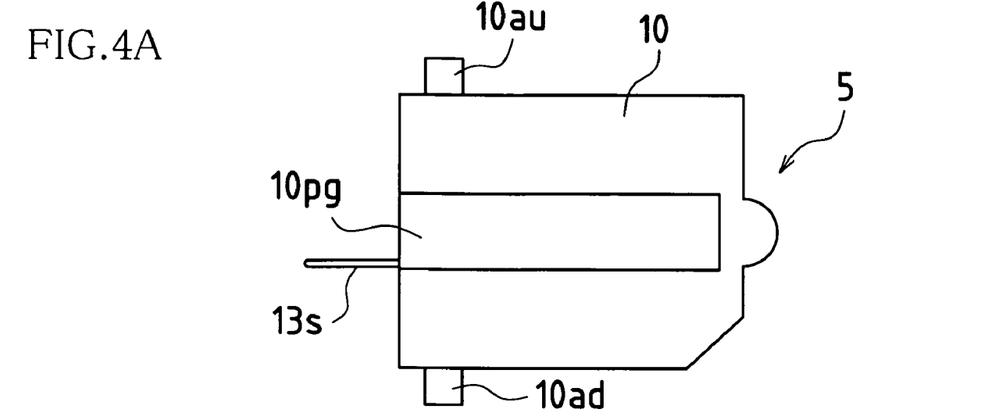
FIG. 4A is a front view of a shutter mechanism unit and a shutter plate of the optical transmission connector of Embodiment 1 of the present invention, as viewed from a side from which an optical plug is inserted.
Figure 4B:
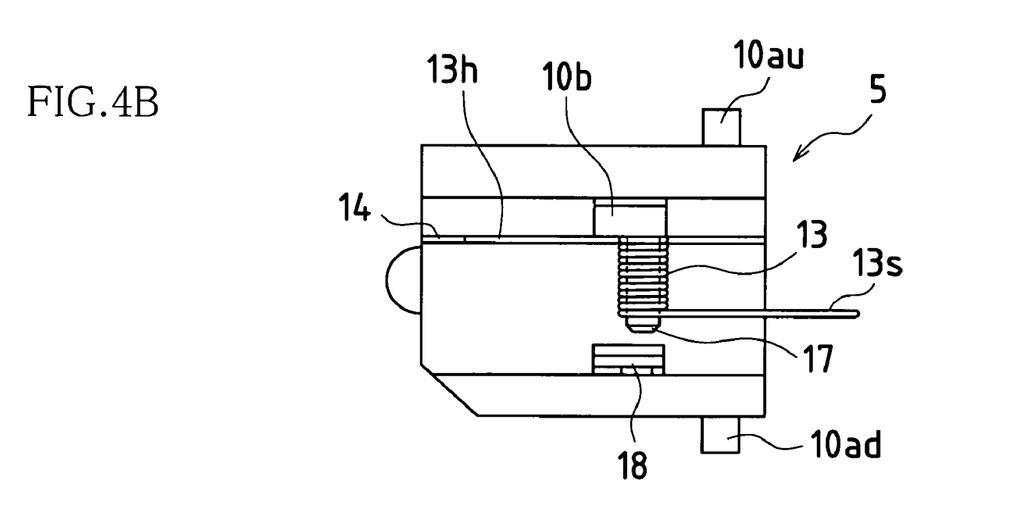
FIG. 4B is a rear view thereof.
Figure 4C:
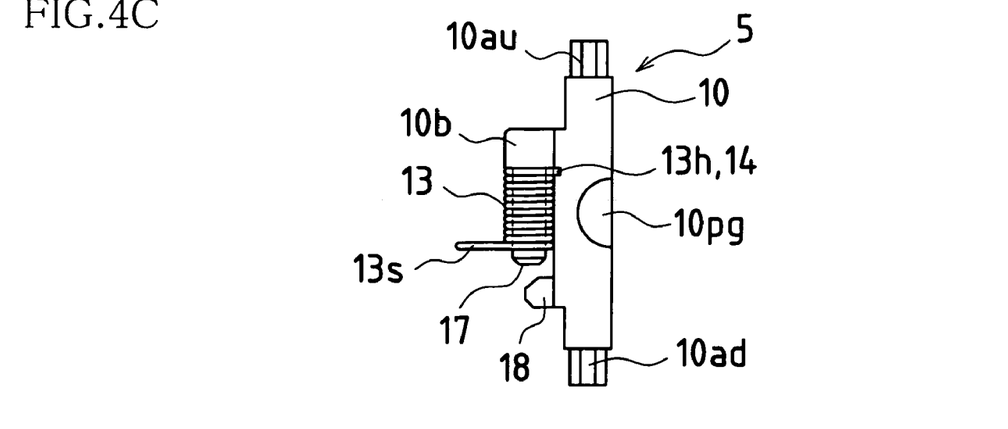
FIG. 4C is a left side view thereof.

FIGS. 4A to 4C are diagrams for explaining the shutter mechanism unit and the shutter plate of the optical transmission connector of Embodiment 1 of the present invention. FIG. 4A is a front view of the shutter mechanism unit and the shutter plate as viewed from a side from which an optical plug is inserted. FIG. 4B is a rear view thereof. FIG. 4C is a left side view thereof.

On the front surface of the shutter plate 10 (from which the optical plug 3 is inserted), the plug guiding groove 10pg is formed for pressing the shutter plate 10 and guiding a tip of the optical plug 3 so that the shutter plate 10 is housed into the optical plug housing unit 4. The shutter plate 10 has the rotating shafts 10au and 10ad in portions at the upper and lower ends which serve as a center of rotation, so that the shutter plate 10 is rotated about the rotating shafts 10au and 10ad as the center of rotation toward the optical plug housing unit 4.

A thick base 10b is formed on a rear surface of the shutter plate 10 (a surface facing the optical plug housing unit 4). The base 10b is provided with a spring attachment shaft 17 to which the spring 13 is attached. The spring attachment shaft 17 extends in a direction parallel to a plane of the shutter plate 10.

The spring 13 is composed of a twisted coil spring, and has a coil portion at a middle thereof, and movable arm portions at both ends thereof. The spring 13 is attached to the spring attachment shaft 17 with the coil portion being engaged with the spring attachment shaft 1. One of the end arm portions (holding spring arm portion 13h) of the spring 13 (twisted coil spring) is fitted into a groove-shaped spring end holding concave portion 14, so that the spring 13 is joined and integrated with the shutter plate 10, and therefore, is stably held. Note that the other end arm portion (sliding spring arm portion 13s) of the spring 13 is a free end, and butts the spring guiding groove portion 15 (see FIGS. 2A and 2B and 5A and 5B) formed inside the holder unit 2.

A spring accidental detachment preventing convex portion 18 (spring accidental detachment preventing unit) for preventing the spring 13 from being accidentally detached is formed, corresponding to a tip of the spring attachment shaft 17. With this structure, even when external force is applied to the spring 13 due to rotation of the shutter plate 10, the spring 13 is prevented from being detached from the spring attachment shaft 17.

The shutter plate 10 can be integrally formed of a synthetic resin or the like together with the base 10b, the rotating shafts 10au and 10ad, the plug guiding groove 10pg, the spring end holding concave portion 14, the spring attachment shaft 17, and the spring accidental detachment preventing convex portion 18.

Figure 5A:
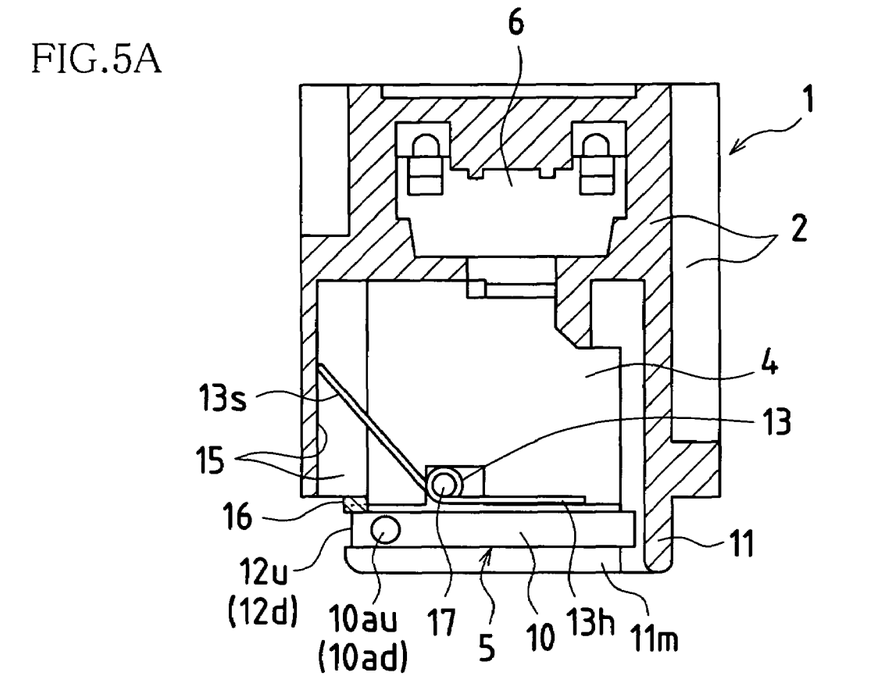
FIG. 5A is a partially cross-sectional, plan view of a shutter plate in a closed state of the optical transmission connector of Embodiment 1 of the present invention.
Figure 5B:
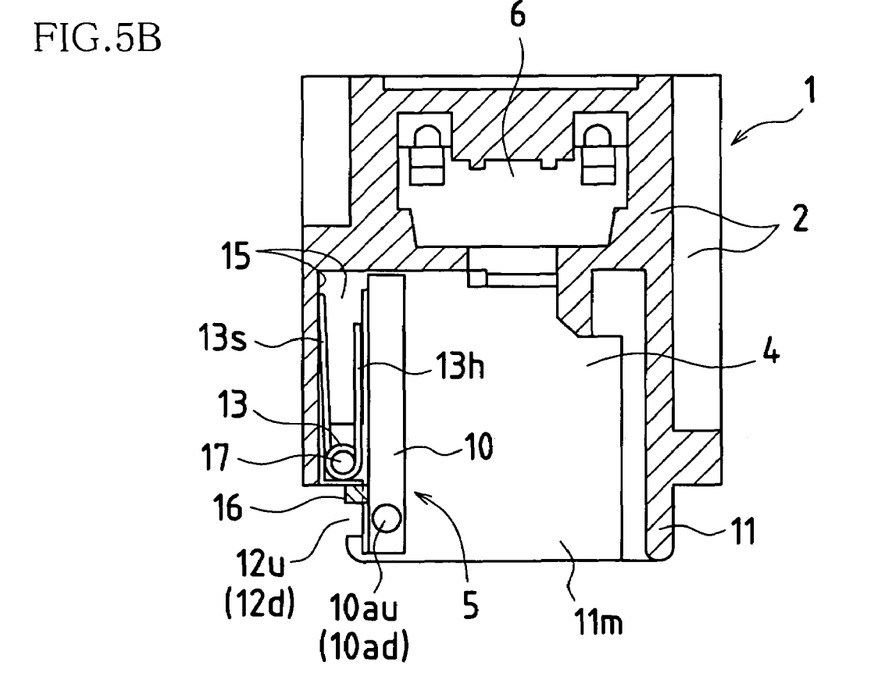
FIG. 5B is a partially cross-sectional, plan view of the shutter plate in an open state.

FIGS. 5A and 5B are diagrams for explaining open and closed states of the shutter plate of the optical transmission connector of Embodiment 1 of the present invention. FIG. 5A is a partially cross-sectional, plan view of the shutter plate in the closed state. FIG. 5B is a partially cross-sectional, plan view of the shutter plate in the open state.

The shutter mechanism unit 5 is constructed by assembling (attaching) the shutter plate 10 from the outside of the holder unit 2 by fitting the rotating shafts 10au and 10ad of the shutter plate 10 into the bearing portions 12u and 12d from the left-hand side in FIGS. 5A and 5B. Since the shutter mechanism unit 5 is attached from the outside of the holder unit 2, it is possible to simplify the structure and assembly process of the optical transmission connector 1.

Since the rotating shafts 10au and 10ad are supported by the bearing portions 12u and 12d, the shutter plate 10 can be freely rotated about the rotating shafts 10au and 10ad (bearing portions 12u and 12d) as the center of rotation toward the optical plug housing unit 4 which is provided inside the holder unit 2 and is used to house the optical plug 3.

Regarding the spring 13 composed of a twisted coil spring, when external force is not applied to the shutter plate 10 in a front direction thereof (in a direction from the optical plug 3 is inserted), the holding spring arm portion 13h (one end arm portion) is fixed and held on the rear surface of the shutter plate 10, while the sliding spring arm portion 13s (the other end arm portion) presses the spring guiding groove portion 15, thereby making it possible to bias the shutter plate 10 in a direction in which the shutter plate 10 is closed. As a result, the shutter plate 10 is caused to be in the closed state (FIG. 5A).

According to this structure, since the sliding spring arm portion 13s butts the spring guiding groove portion 15, the sliding spring arm portion 13s does not perform an operation other than sliding along a course determined by the spring guiding groove portion 15, so that the shutter plate 10 is prevented from being detached from the holder unit 2 (the attachment portion 11).

When external force is applied to the shutter plate 10 by the optical plug 3 (here, not shown) being inserted in a front direction thereof (a direction in which the optical plug 3 is inserted), the shutter plate 10 is rotated inward due to the external force, so that the shutter plate 10 is eventually housed in the optical plug housing unit 4 (inside the holder unit 2) in a direction intersecting an insertion opening 11m, and is in the open state (FIG. 5B). In this case, the spring 13 is also housed in the holder unit 2 as well as the shutter plate 10.

In the open state, the sliding spring arm portion 13s which is a free end opposite to the holding spring arm portion 13h fixed to the shutter plate 10 is slid along the inside (the spring guiding groove portion 15) of the holder unit 2, and when the optical plug 3 is completely housed, the sliding spring arm portion 13s is completely pressed against the spring guiding groove portion 15, so that the sliding spring arm portion 13s is restrained from being moved due to the repelling force of the spring. When external force is removed, the spring repelling force of the spring 13 acts, as restoring force, on the shutter plate 10, so that the shutter plate 10 returns to the original closed state.

The accidental detachment preventing convex portion 16 is provided at a position corresponding to the outside of the spring guiding groove portion 15 which houses the sliding spring arm portion 13s (the spring 13) so as to prevent the spring 13 from being detached from the inside to the outside of the holder unit 2 due to the spring repelling force or the like. Note that the accidental detachment preventing convex portion 16 is not limited to this form and can be in various forms.

Figure 6A:
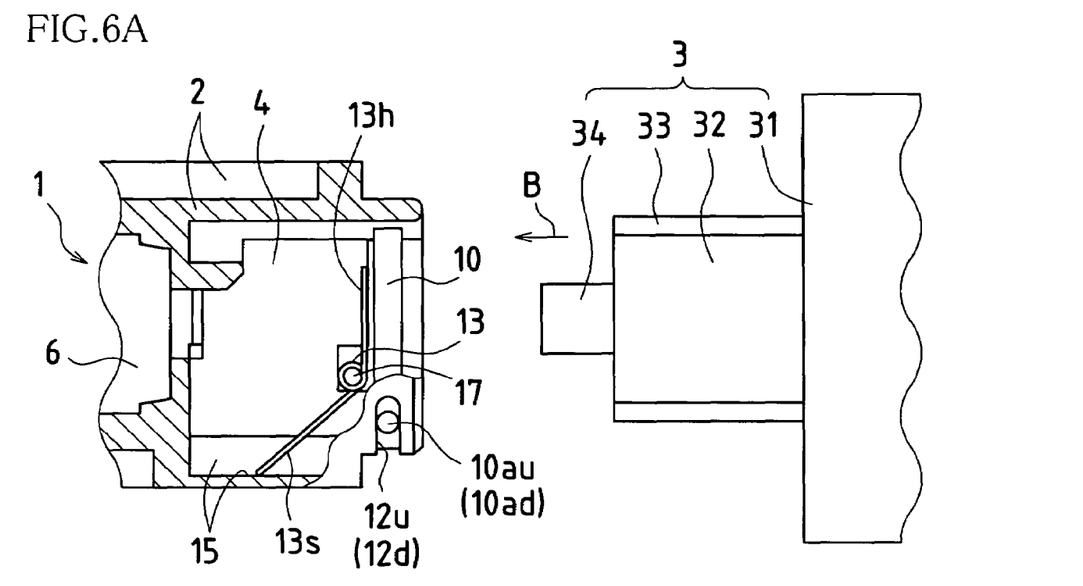
FIG. 6A is a partially cut-away, partially cross-sectional, plan view indicating a state before an optical plug is inserted.
Figure 6B:
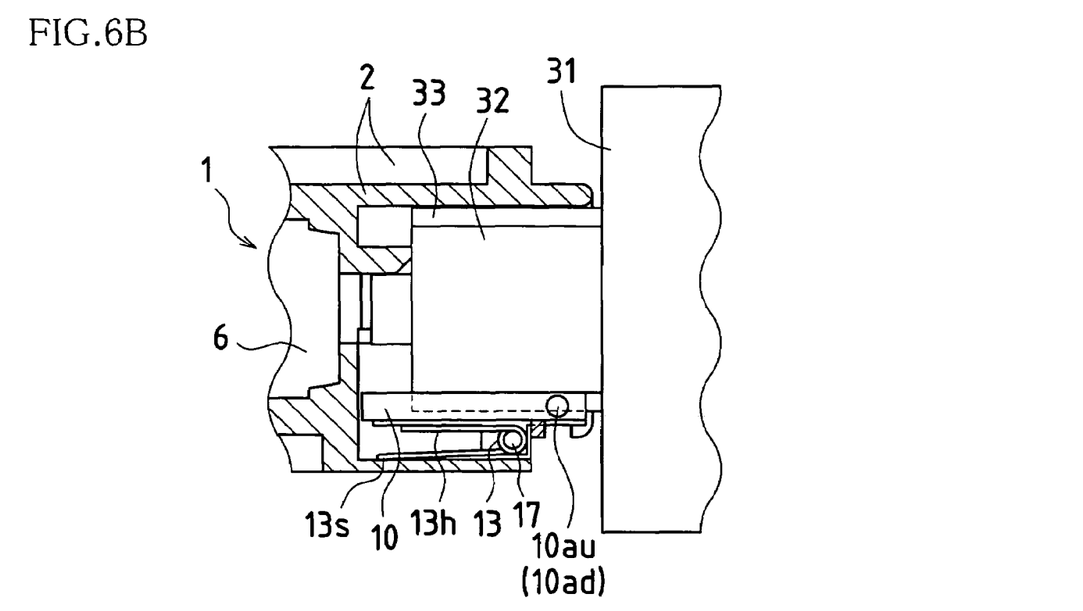
FIG. 6B is a partially cross-sectional, plan view indicating a state after an optical plug is inserted.

FIGS. 6A and 6B are diagram for explaining a relationship between the optical transmission connector of Embodiment 1 of the present invention and an optical plug. FIG. 6A is a partially cut-away, partially cross-sectional, plan view indicating a state before an optical plug is inserted. FIG. 6B is a partially cross-sectional, plan view indicating a state after an optical plug is inserted.

The configuration of the optical transmission connector 1 is the same as that of FIGS. 5A and 5B and the like and will not be described in detail.

The optical plug 3 is generally composed of an optical plug housing 31 serving as an exterior, an optical plug insertion portion 32 to be inserted into the optical transmission connector 3, a positioning protrusion 33 which is formed on a side surface of the optical plug insertion portion 32 and is used to reliably position the optical plug insertion portion 32, and an optical fiber portion 34 for transmitting an optical signal (FIG. 6A).

The optical plug 3 is moved in a direction indicated with arrow B (FIG. 6A), and the shutter plate 10 is pushed by the optical plug insertion portion 32, so that the optical plug 3 (the optical plug insertion portion 32) is inserted into the optical plug housing unit 4 of the optical transmission connector 1 (FIG. 6B). Stability in the vertical direction is secured due to the positioning protrusion 33, thereby making it possible to prevent the optical plug insertion portion 32 from swaying in the vertical direction.

Figure 7A:
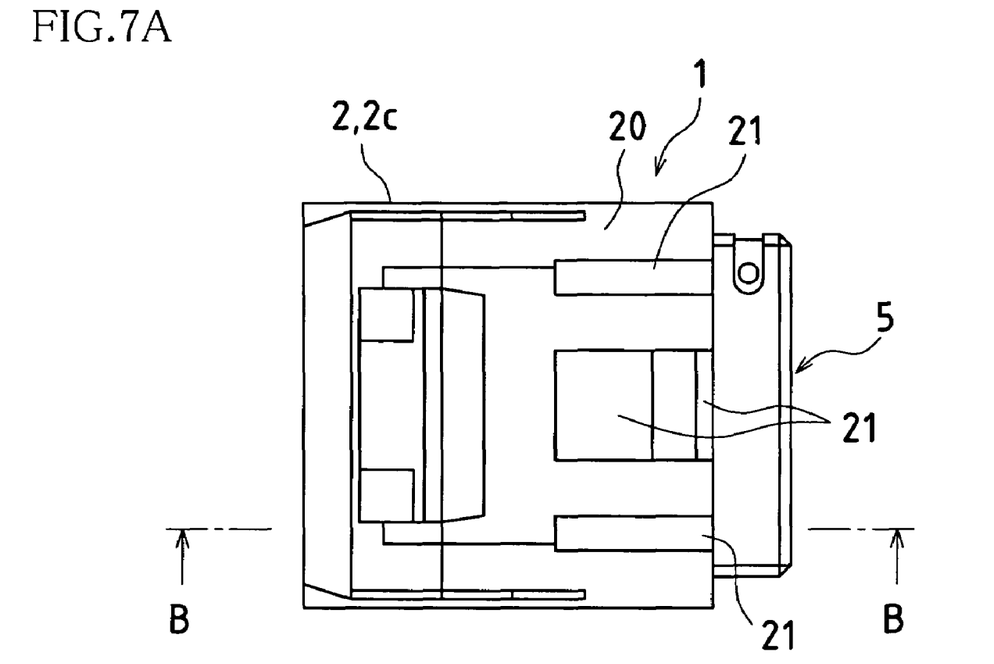
FIG. 7A is a bottom view of a bottom surface concave portion formed on a bottom surface of the optical transmission connector of Embodiment 1 of the present invention.
Figure 7B:
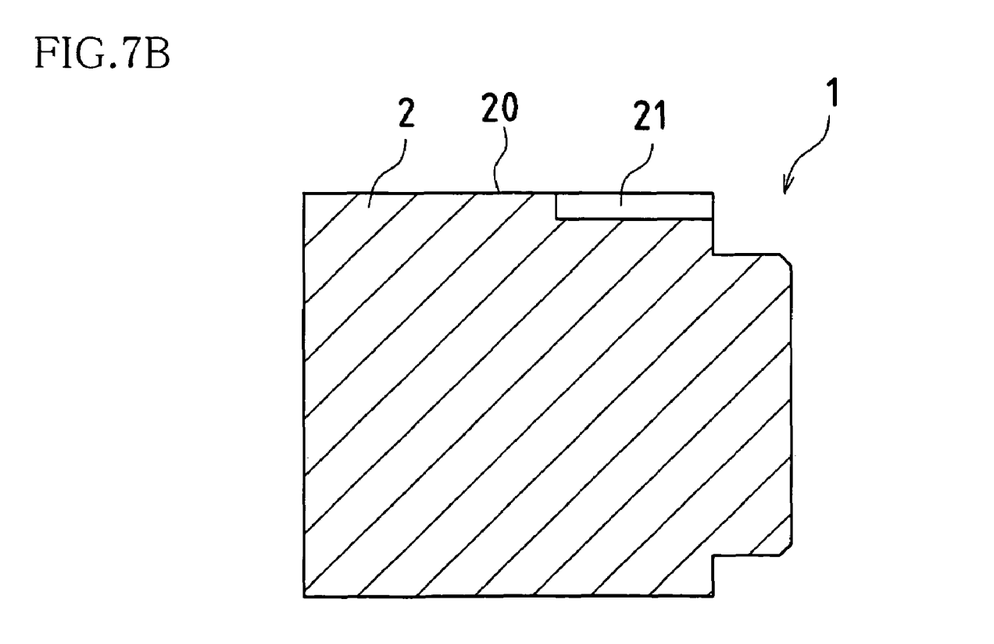
FIG. 7B is a cross-sectional view, taken along line B-B of FIG. 7A, where the internal structure is not shown.

FIGS. 7A and 7B are diagrams for explaining a bottom surface concave portion formed on a bottom surface of the optical transmission connector of Embodiment 1 of the present invention. FIG. 7A is a bottom view thereof. FIG. 7B is a cross-sectional view, taken along line B-B of FIG. 7A, where the internal structure is not shown.

A bottom surface concave portion 21 (a portion having a reduced thickness) is formed on a bottom surface 20 of the holder unit 2, corresponding to the shutter mechanism unit 5. With this structure, a surface distance with respect to a flux can be increased, thereby making it possible to prevent the flux from seeping up to the shutter mechanism unit 5 (the shutter plate 10) to interfere with the operation of the shutter mechanism unit 5, when the optical transmission connector 1 (the holder unit 2) is mounted onto the mounting board 40. In other words, the reliability of the optical transmission connector 1 can be increased by providing the shutter mechanism unit 5 which reliably performs the shutter operation.

Embodiment 2

An electronic apparatus (not shown) according to this embodiment is an electronic apparatus in which the optical plug 3 is connected to the optical transmission connector 1 of Embodiment 1, and the optical transmission connector 1 is mounted on the mounting board 40 of the electronic apparatus.

Therefore, the configuration is simple and the number of parts is small, thereby making it possible to provide an electronic apparatus which is easy to assemble, has high reliability, and can be manufactured with low cost.

The present invention can be embodied and practiced in other different forms without departing from the spirit and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. An optical transmission connector comprising:
   a holder unit including an element housing unit for housing a photoelectric effect element and an optical plug housing unit for housing an optical plug;
   a shutter mechanism unit for opening and closing the optical plug housing unit; and
   a fixing metal plate for fixing the holder unit to a mounting board,
   wherein the fixing metal plate has a fixing terminal unit protruding from a bottom portion of the holder unit, the fixing metal plate extending over an upper portion and a side portion of the holder unit, wherein the fixing metal plate extends along the side portion by including a first portion that extends in a top to bottom direction relative to the holder unit, a second portion that extends from the first portion in a front to back direction relative to the holder unit, and a third portion that extends from the second portion in a top to bottom direction relative to the holder unit and the fixing terminal unit has a bent portion in a length direction thereof.

2. The optical transmission connector according to claim 1, wherein the bent portion is in the shape of a wedge.

3. The optical transmission connector according to claim 1, wherein the fixing metal plate is symmetrically provided on left and right side portions of the holder unit.

4. The optical transmission connector according to claim 3, wherein the fixing metal plate symmetrically provided on the left and right side portions of the holder unit, continuously extends across an upper portion of the holder unit.

5. The optical transmission connector according to claim 1, wherein the shutter mechanism unit has a shutter plate, and the shutter plate has a spring end holding concave portion for holding an end of a spring for biasing the shutter plate in a direction in which the shutter plate is closed.

6. The optical transmission connector according to claim 5, wherein the shutter plate has a spring attachment shaft which is engaged with the spring.

7. The optical transmission connector according to claim 6, wherein the shutter plate has a spring accidental detachment preventing unit for preventing the spring from being accidentally detached, corresponding to the spring attachment shaft.

8. The optical transmission connector according to claim 5, wherein the spring is housed into the holder when an optical plug is inserted into the optical plug housing unit.

9. The optical transmission connector according to claim 5, wherein the other end of the spring is slid in the holder when an optical plug is inserted into the optical plug housing unit.

10. The optical transmission connector according to claim 9, wherein the other end of the spring is slid along a spring guiding groove portion provided in the holder.

11. The optical transmission connector according to claim 1, wherein a bottom surface of the holder has a bottom surface concave portion for preventing seepage of a flux, corresponding to the shutter mechanism unit.

12. The optical transmission connector according to claim 1, wherein the photoelectric effect element is a light receiving element or a light emitting element.

13. The optical transmission connector according to claim 5, wherein a length of the spring attachment shaft is less than a length of the shutter plate.

14. The optical transmission connector according to claim 1, further comprising a base for holding a spring is formed on a shutter plate of the shutter mechanism unit, wherein a length of the base attached to the spring is less than a length of the shutter plate.

15. The optical transmission connector according to claim 14, wherein the shutter plate has a spring accidental detachment preventing unit for preventing the spring from being accidentally detached, corresponding to the spring attachment shaft, wherein a length of the base attached to the spring with the spring accidental detachment preventing unit is less than a length of the shutter plate.

16. The optical transmission connector according to claim 2, the wedge is directed inward towards the holder unit.

17. The optical transmission connector according to claim 1, wherein the intersection of the first portion and the second portion is a first notch and intersection of the second portion and the third portion is a second notch.

18. The optical transmission connector according to claim 17 wherein the fixing metal plate has a positioning concave portion which is engaged with a positioning convex portion provided in the holder unit located at the first notch.

19. The optical transmission connector according to claim 17, wherein the fixing metal plate is configured to fit into a fitting slit provided in the holder unit located at the second notch.

20. The optical transmission connector according to claim 18, wherein the fixing metal plate is configured to fit into a fitting slit provided in the holder unit located at the second notch.

21. The optical transmission connector according to claim 18, wherein the fixing metal plate is symmetrically provided on left and right side portions of the holder unit.

22. The optical transmission connector according to claim 19, wherein the fixing metal plate is symmetrically provided on left and right side portions of the holder unit.

23. The optical transmission connector according to claim 18, wherein the fixing metal plate symmetrically provided on the left and right side portions of the holder unit, continuously extends across an upper portion of the holder unit.

24. The optical transmission connector according to claim 19, wherein the fixing metal plate symmetrically provided on the left and right side portions of the holder unit, continuously extends across an upper portion of the holder unit.

25. The optical transmission connector according to claim 20, wherein the fixing metal plate symmetrically provided on the left and right side portions of the holder unit, continuously extends across an upper portion of the holder unit.

26. An optical transmission connector with an optical plug connected thereto, wherein the optical transmission connector is the optical transmission connector according to claim 1.

27. An electronic apparatus comprising an optical transmission connector, wherein the optical transmission connector is the optical transmission connector according to claim 1.

* * * * *